INVENTORS
NORIO TSUBOUCHI
MASAO TAKAHASHI
TOMEJI OHNO
TSUNEO AKASHI
BY
Hopgood & Calimafde
ATTORNEYS INVENTORS
NORIO TSUBOUCHI
MASAO TAKAHASHI
TOMEJI OHNO
TSUNEO AKASHI
BY
Hopgood & Calimafde
ATTORNEYS United States Patent Office 3,533,950

Patented Oct. 13, 1970

3,533,950

PIEZOELECTRIC CERAMICS INCLUDING Bi OR Sb

Norio Tsubouchi, Masao Takahashi, Tomeji Ohno, and Tsuneo Akashi, Tokyo, Japan, assignors to Nippon Electric Company, Limited, Tokyo, Japan Filed Aug. 23, 1968, Ser. No. 754,934

Claims priority, application Japan, Aug. 31, 1967, 42/56,179, 42/56,180

Int. Cl. C04b *35/00*

U.S. Cl. 252—62.9 2 Claims

ABSTRACT OF THE DISCLOSURE

A novel piezoelectric material having a large electromechanical coupling factor consisting of a solid solution of $Pb(Ni_{1/3}Z_{2/3})O_3$, $PbTiO_3$ and $PbZrO_3$, where Z represents an element selected from the group consisting of Bi and Sb. Up to 25 atom percent of Pb may be replaced by an element selected from the group consisting of Ba, Sr and Ca. The amounts of Pb $(Ni_{1/3}Z_{2/3})O_3$, $PbTiO_3$ and $PbZrO_3$ are determined by the area enclosed substantially within the vertices A through G and H through M, respectively depicted in the triaxial diagrams of FIGS. 1 and 4.

BACKGROUND OF THE INVENTION

This invention relates to piezoelectric materials and more particularly to novel piezoelectric ceramics having excellent properties suitable for use in particular fields.

One of the typical fields of application of piezoelectric materials is the manufacture of transducers for transmitting and receiving ultrasonic waves. In this case, the electromechanical coupling factor is the most essential characteristic for evaluating in practice the properties of piezoelectric materials to be used. The electromechanical coupling factor is representative of the efficiency of the transformation of the electric oscillation into mechanical vibration and conversely of transforming the mechanical vibration into electrical oscillation; the greater the value, the better the efficiency of the conversion and the more desired the piezoelectric materials in the manufacture of transducers.

Piezoelectric materials have some other fundamental factors, such as dielectric loss, dielectric constant and mechanical quality factor, which serve evaluation purposes. In transducers, a small dielectric loss is desired as is a large or small dielectric constant depending on electric loads; the mechanical quality factor is not as important.

The above matters are described in detail in, for example, D. Berlincourt et al., "Transducer Properties of Lead Titanate Zirconate Ceramics," IRE Transactions on Ultrasonic Engineering, February, 1960, pp. 1–6 and R. C. V. Macario, "Design Data for Band-Pass Ladder Filters Employing Ceramic Resonators," Electronic Engineering, vol. 33, No. 3, (1961) pp. 171–177.

It is often true, however, that conventional piezoelectric ceramics, for example, barium titanate ($BaTiO_3$) and lead titanate zirconate $[Pb(Ti \cdot Zr)O_3]$ have the small electromechanical coupling factor and are unfit for the practical use. Improvement of this factor has been made only by way of incorporating various additional constituents into the ceramics.

It is the object of this invention to provide a novel piezoelectric ceramic having the large electromechanical coupling factor.

It is another object of this invention to provide a novel piezoelectric ceramic suited for use in particular fields such as manufacture of transducers for transmitting and receiving ultrasonic waves.

SUMMARY OF THE INVENTION

This invention is based on the discovery that ceramic compositions consisting essentially of a solid solution of the $Pb(Ni_{1/3}Z_{2/3})O_3$—$PbTiO_3$—$PbZrO_3$ ternary system, where Z represents one element selected from Bi and Sb, shows an excellent piezoelectric activity and hence has a practical utility.

These ceramic compositions contain lead (Pb) as a divalent metallic element and also titanium (Ti) and zirconium (Zr) as tetravalent metallic elements. Moreover, the element nickel (Ni) and one element selected from bismuth (Bi) and antimony (Sb) are contained in such a proportion that they are, as a whole, substantially equivalent to a tetravalent metallic element. Up to 25 atom percent of lead (Pb) contained in the compositions may be replaced by at least one of barium (Ba), strontium (Sr) and calcium (Ca).

Where bismuth (Bi) is selected for Z and the ceramics of the $Pb(Ni_{1/3}Bi_{2/3})O_3$—$PbTiO_3$—$PbZrO_3$ ternary system are represented by the compositional formula $$[Pb(Ni_{1/3}Sb_{2/3})O_3]_x[PbTiO_3]_y[PbZrO]_z$$

where $x$, $y$ or $z$ is the molecular ratio of each component and $x+y+z=1.00$, it has been found that the ceramic compositions showing an excellent piezoelectric activity, are restricted within the range determined by the following combinations of the molecular ratios $x$, $y$ and $z$:

| $x$ | $y$ | $z$ |
|---|---|---|
| 0.01 | 0.61 | 0.38 |
| 0.01 | 0.09 | 0.90 |
| 0.05 | 0.05 | 0.90 |
| 0.20 | 0.05 | 0.75 |
| 0.40 | 0.28 | 0.32 |
| 0.30 | 0.50 | 0.20 |
| 0.10 | 0.70 | 0.20 |

When antimony (Sb) is selected for Z, it has been found that the particularly desirable piezoelectric activity is possessed by the compositions given by the formula $$[Pb(Ni_{1/3}Sb_{2/3})O_3]_x[PbTiO_3]_y[PbZrO]_z$$

where $x+y+z=1.00$, and lying within the range decided by the following combinations of the molecular ratios $x$, $y$ and $z$:

| $x$ | $y$ | $z$ |
|---|---|---|
| 0.01 | 0.55 | 0.44 |
| 0.01 | 0.09 | 0.90 |
| 0.05 | 0.05 | 0.90 |
| 0.40 | 0.05 | 0.55 |
| 0.40 | 0.40 | 0.20 |
| 0.05 | 0.75 | 0.20 |

Conventional piezoelectric ceramic compositions, such as the $Pb(Mg_{1/3}Nb_{2/3})O_3$—$PbTiO_3$—$PbZrO_3$ ternary system, does not alone improve the piezoelectric properties of the previous $PbTiO_3$—$PbZrO_3$ ceramics. An excellent piezoelectric ceramic material is obtained only by adding thereto at least one of oxides of manganese, cobalt, nickel, iron and chromium as additional constituents up to 3 weight percent. In contrast, the $$Pb(Ni_{1/3}Z_{2/3})O_3—PbTiO_3—PbZrO_3$$

compositions of this invention where Z represents Bi or Sb remarkably improve the piezoelectric properties without any additional constituent. This difference in improvement of piezoelectric properties between the conventional compositions and the novel compositions of this invention is, it is believed, due to the fact that the conventional compositions uses in its basic composition magnesium (Mg), an element belonging to the Group II–A in the Periodic Table, in conjunction with a Group V–B element niobium (Nb), while in the composition of this invention a Group VIII–B element nickel (Ni) is used in conjunction with a Group V–A element bismuth (Bi) or antimony (Sb).

DESCRIPTION OF THE DRAWINGS

The above-mentioned and other features and objects of this invention and the manner of attaining them will become more apparent and the invention itself will best be understood by reference to the following description of an embodiment of the invention taken in conjunction with the accompanying drawings, the description of which follows.

FIGS. 2 and 5 are graphs showing the electromechanical coupling factors of both the conventional lead titanate-lead zirconate ceramics and the ceramics of this invention, as a function of change in the lead titanate content in both the ceramics; and FIGS. 3 and 6 are phase diagrams of the ternary system of this invention; while FIGS. 1, 2 and 3 are for the novel ternary system $$Pb(Ni_{1/3}Bi_{2/3})O_3—PbTiO_3—PbZrO_3$$

among the ceramic compositions of this invention; and FIGS. 4, 5 and 6 are for the novel ternary system $$Pb(Ni_{1/3}Sb_{2/3})O_3—PbTiO_3—PbZrO_3$$

Figure 1:
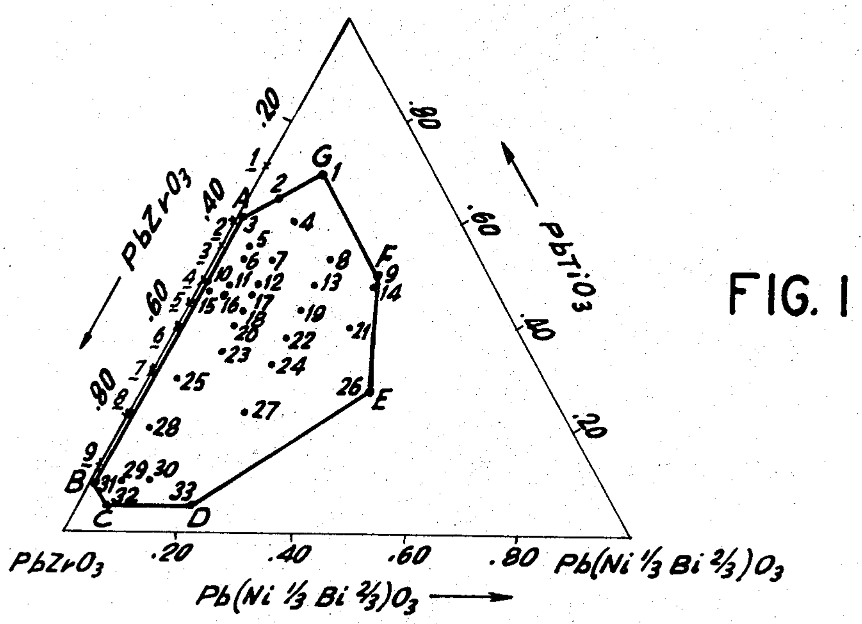
FIGS. 1 and 4 are composition ternary diagrams depicting both the effective ranges of the compositions of this invention and the specific compositions as exemplified in the examples.

among the ceramic compositions of this invention.

DETAILED DESCRIPTION OF THE INVENTION

Unless otherwise stated, powdered materials of lead monoxide (PbO), nickel monoxide( NiO), bismuth sesquioxide ($Bi_2O_3$), titanium dioxide ($TiO_2$), and zirconium dioxide ($ZrO_2$) were used as starting materials to obtain the $Pb(Ni_{1/3}Bi_{2/3})O_3—PbTiO_3—PbZrO_3$ ceramics of this invention. These powdered materials were so weighed tht the final specimens would have the compositional proportions shown in Table 1. Also, unless otherwise stated, powdered materials of lead monoxide (PbO), nickel monoxide (NiO), antimony sesquioxide ($Sb_2O_3$), titanium dioxide ($TiO_2$), and zirconium dioxide ($ZrO_2$) were used as starting materials to obtain the $$Pb(Ni_{1/3}Sb_{2/3})O_3—PbTiO_3—PbZrO_3$$

ceramics of this invention. These powders were also weighed in such a manner that the final specimens have the compositional proportions shown in Table 2. Here, a bismuth sesquioxide ($Bi_2O_3$) and antimony sesquioxide ($Sb_2O_3$) were weighed as calculated on the basis of bismuth pentoxide ($Bi_2O_5$) and antimony pentoxide ($Sb_2O_5$), respectively. In addition, the powder of lead monoxide, titanium dioxide and zirconium dioxide were weighed to obtan the conventional lead titanate-lead zirconate ceramics having the compositional proportions shown in Table 3.

The respective powders were mixed in a ball mill with distilled water. The mixed powders were subjected to filtration, dried, crushed, then presintered at 900° C. for one hour, and again crushed. As for the specimens containing more than 0.05 of the $Pb(Ni_{1/3}Bi_{2/3})O_3$ content, the presintering process was carried out at 650° C. for two hours. Thereafter, the mixtures, with a small amount of distilled water being added thereto, were press-molded into discs of 20 mm. in diameter at a pressure of 700 kg./cm.[2] and sintered in an atmosphere of lead monoxide (PbO) for one hour at a temperature between 1260° C. and 1300° C. The specimens containing 0.05 or less of the $$Pb(Ni_{1/3}Bi_{2/3})O_3$$

content, more than 0.05 and up to 0.10 of the same and more than 0.10 of the same were sintered at temperatures of 1260° C., 1100° C. and 900° C., respectively. The resulting ceramic discs were polished on both surfaces to the thickness of one millimeter, provided with silver electrodes on both surfaces, and thereafter piezoelectrically activated through the polarization treatment for one hour at temperature as specified in Table 4 under an applied D.C. electric field of a value also specified in Table 4.

TABLE 4

| Specimens | $Pb(Ni_{1/3}Bi_{2/3})O_3$ content $X_1$ $X_1 \leqq 0.05$, $0.05 < X_1 \leqq 0.10$, $0.01 < X_1$ | | | $Pb(Ni_{1/3}Sb_{2/3})O_3$ content $X_2$ $X_2 \leqq 0.10$, $0.10 < X_2 \leqq 0.20$, $0.20 < X_2$ | | |
|---|---|---|---|---|---|---|
| Temperature, ° C. | 100 | (1) | (1) | 100 | (1) | (1) |
| Electric field (kv./cm.) | 40 | 40 | 30 | 50 | 50 | 40 |

[1] Room temperature.

After the ceramic discs had been allowed to stand for 24 hours, the electromechanical coupling factor for the radial mode vibration ($k_r$) and the mechanical quality factor ($Q_m$) were measured to evaluate the piezoelectric activities. The measurement of these piezoelectric properties was made according to the IEEE standard circuit. The value of $k_r$ was calculated by the resonant to antiresonant frequency method. The dielectric constant ($\epsilon$) and the dielectric loss ($\tan \delta$) were measured at a frequency of 1 kHz.

Tables 1, 2 and 3 show typical results obtained. In the tables, the specimens are arranged according to the amount of the $PbTiO_3$ content and there are also listed several values of Curie temperature which was determined through measurement of temperature variation in the dielectric constant ($\epsilon$). The novel compositions of the specimens of Tables 1 and 2 are shown with black points in FIGS. 1 and 4, respectively, while the conventional compositions of the specimens of Table 3 are indicated by crosses in the same figures.

Comparison of the results for the specimens Nos. 15 and 16 of Table 1, or 16 and 17 of Table 2 with those for the specimen No. 4 of Table 3 will reveal that the greatest $k_r$ values of the novel ceramics of this invention are far superior to the maximum $k_r$ value of the conventional lead titanate zirconate ceramic which has been known as the most excellent piezoelectric ceramic. Moreover, comparison of the results in Table 1 or 2 with those in Table 3, particularly between the novel and conventional ceramics in which the ratios of the amounts of the $PbTiO_3$ and $PbZrO_3$ contents are similar to each other, will also indicate that the ceramics of this invention have a remarkably improved $k_r$ value. This latter fact will be more clearly understood from FIGS. 2 or 5, wherein the curve of a thick line represents the $k_r$ values of the novel ceramics containing 0.05 of $Pb(Ni_{1/3}Bi_{2/3})O_3$ [FIG. 2] or $Pb(Ni_{1/3}Sb_{2/3})O_3$ [FIG. 5], the varying amount $y$ of $PbTiO_3$ and the remaining amount of $PbZrO_3$, while the curve of a fine line shows the $k_r$ values of the conventional lead titanate zirconate ceramics with the varying amount $y$ of $PbTiO_3$.

As is seen from the above, this invention provides the excellent, useful piezoelectric ceramic compositions having piezoelectric activity.

Figure 4:
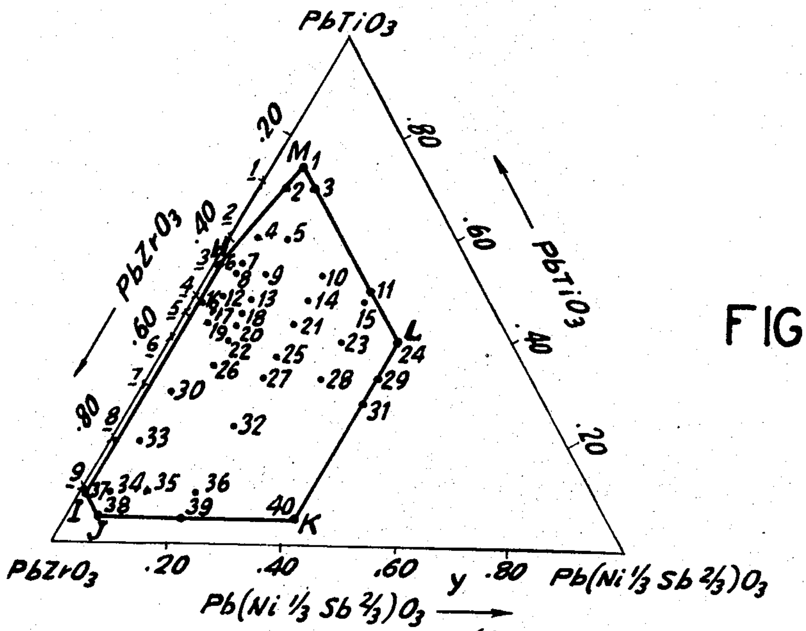

In the novel ceramics of $$Pb(Ni_{1/3}Z_{2/3})O_3—PbTiO_3—PbZrO_3$$

ternary system (Z is Bi or Sb) of this invention, the superior piezoelectric properties as mentioned above are possessed by the compositions represented by the formula $$[Pb(Ni_{1/3}Z_{2/3})O_3]x[PbTiO_3]y[PbZrO_3]z$$

where $x$, $y$ and $z$ represent a set of molecular ratios and $x+y+z=1.00$ and where Z represents one element selected from Bi and Sb, and lying within the area A–B–C–D–E–F–G of FIG. 1 of the drawings where Bi is selected for Z and within the area H–I–J–K–L–M of FIG. 4 of the drawings where Sb is selected for Z. The sets of molecular ratios of the vertices of each area are as follows:

| | $x$ | $y$ | $z$ |
|---|---|---|---|
| A | 0.01 | 0.61 | 0.38 |
| B | 0.01 | 0.09 | 0.90 |
| C | 0.05 | 0.05 | 0.90 |
| D | 0.20 | 0.05 | 0.75 |
| E | 0.40 | 0.28 | 0.32 |
| F | 0.30 | 0.50 | 0.20 |
| G | 0.10 | 0.70 | 0.20 |
| H | 0.01 | 0.55 | 0.44 |
| I | 0.01 | 0.09 | 0.90 |
| J | 0.05 | 0.05 | 0.90 |
| K | 0.40 | 0.05 | 0.55 |
| L | 0.40 | 0.40 | 0.20 |
| M | 0.05 | 0.75 | 0.20 |

In case the content of $Pb(Ni_{1/3}Bi_{2/3})O_3$ or $$Pb(Ni_{1/3}Sb_{2/3})O_3$$

is less than that lying within the above-mentioned area, the piezoelectric activities of the ceramics obtained are inferior to or nearly equal to those of the conventional lead titanate zirconate ceramics. If the content of $Pb(Ni_{1/3}Z_{2/3})O_3$ [Z is Bi or Sb] is more than that lying within the above-mentioned area, accomplishment of the sintering is difficult and a uniform solid solution of the three components is hardly obtainable, with the result that the piezoelectric activities of the ceramics deteriorate and make practical use impossible. Where the content of $PbTiO_3$ is outside the above-mentioned area, it is difficult to sinter a dense ceramic and the product does not have practical piezoelectric activities. Finally, in case the content of $PbZrO_3$ does not fall within the above-mentioned area, there results a useful piezoelectric ceramic having markedly inferior piezoelectric activities.

In view of the above, it has been determined that the ceramics of this invention, if required to apply to a practical use, should have the compositions lying within any of the areas specified above. The ceramics of this effective composition show excellent piezoelectric activities and have a high Curie temperature, as shown in Tables 1 and 2, so that the piezoelectric activities may not be lost up to elevated temperature.

Figures 2, 3:
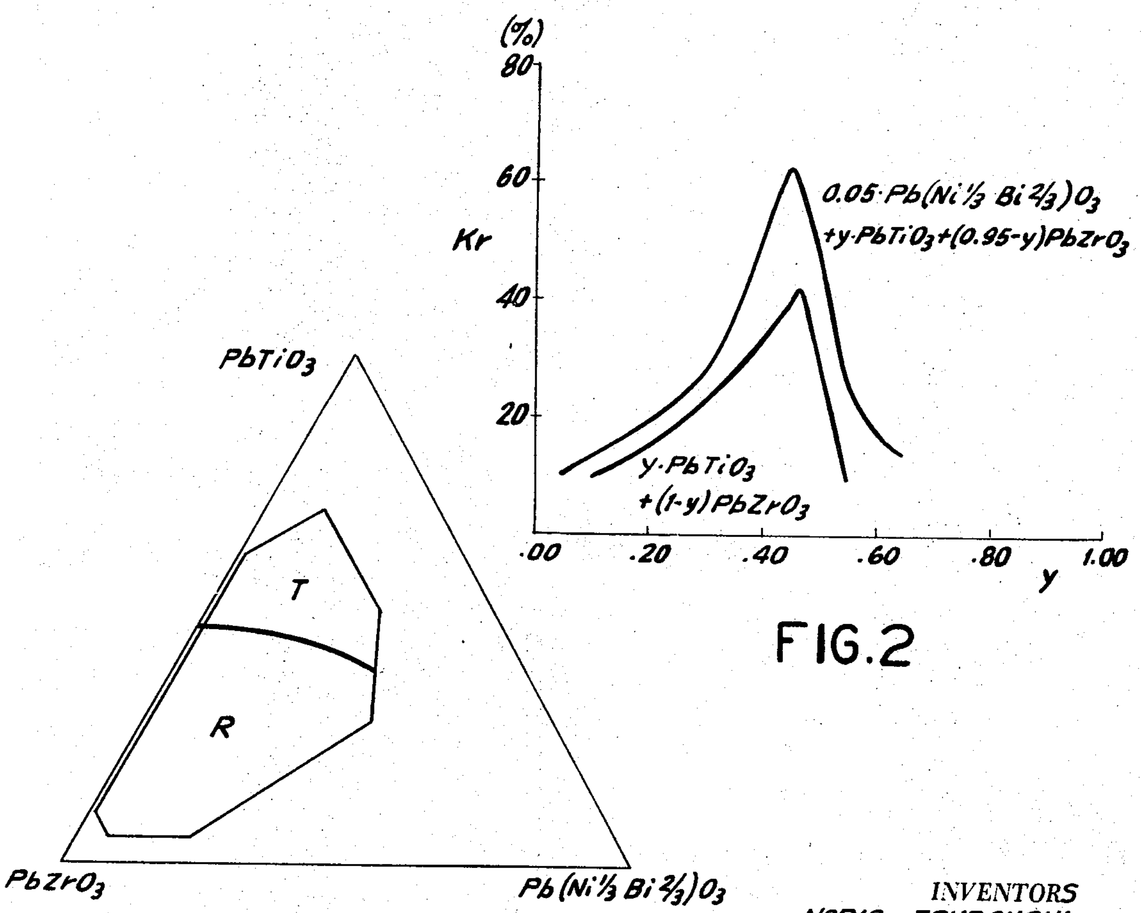
Figures 5, 6:
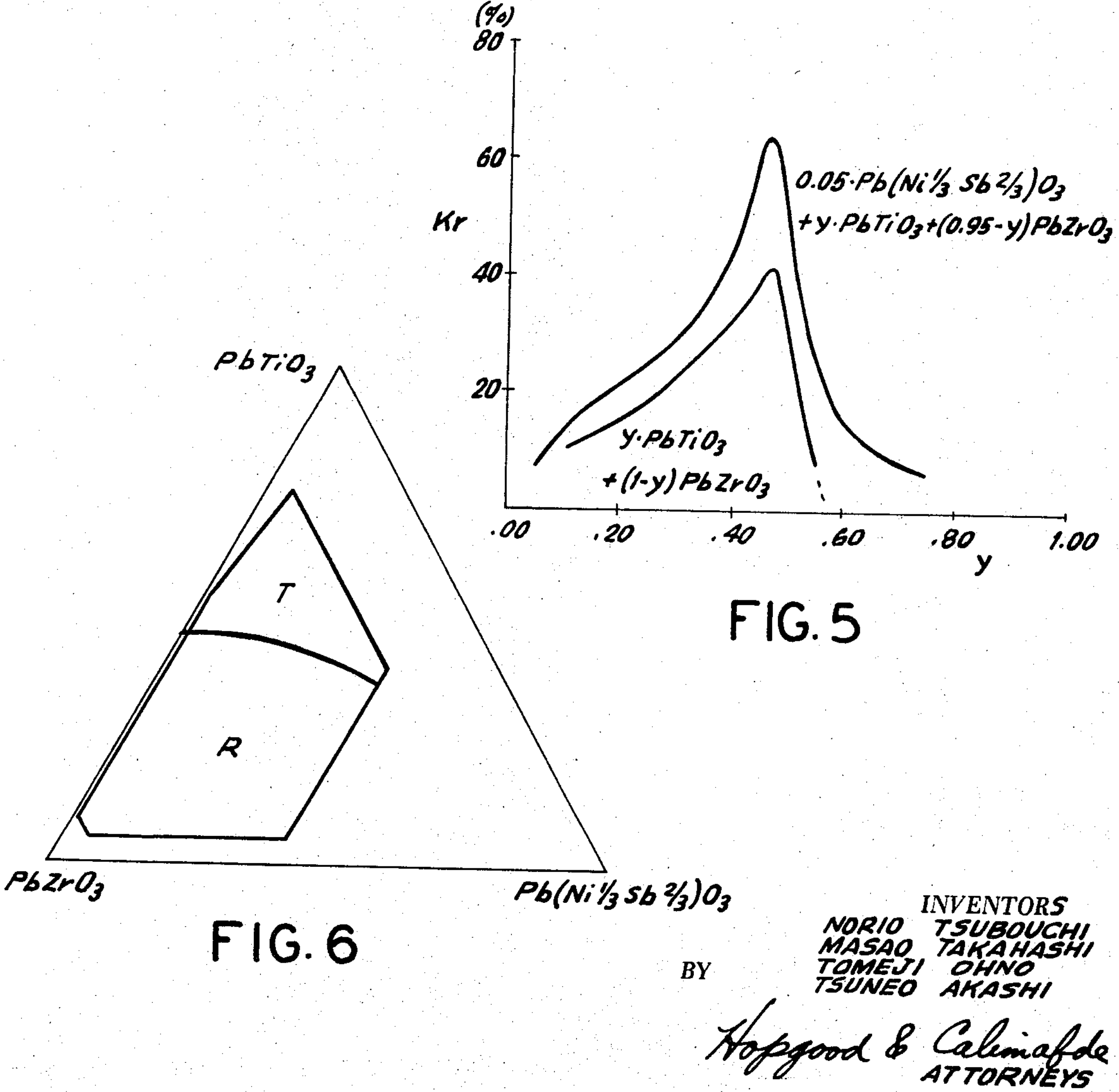

The ternary system of $Pb(Ni_{1/3}Z_{2/3})O_3$ (Z is Bi or Sb), $PbTiO_3$ and $PbZrO_3$ of this invention exists in a solid solution in greater parts of compositions and such a solid has a perovskite-type crystalline structure. FIGS. 3 and 6 show the crystalline phases of the ceramic compositions lying within the areas A–B–C–D–E–F–G of FIG. 1 and H–I–J–K–L–M of FIG. 4, respectively, as determined at room temperature by the powder method of X-ray analysis. These compositions have a perovskite-type crystalline structure and being to either the tetragonal phase (indicated by "T" in the figures) or the rhombohedral phase (indicated by "R"). The transition boundary of the two phases is shown with a thick line in each figure. In general, the value of $k_r$ is the greatest in the vicinity of this transition boundary.

It will be apparent that the starting materials to be used in manufacture of the ceramics of this invention are not limited to those used in the above examples. In detail, those oxides may be used instead of any starting material of the above examples, which are easily decomposed at elevated temperature to form required compositions. For instance, $Pb_3O_4$ may be used instead of PbO as exemplified in the examples. Also, $Ni_2O_3$ or $Ni_3O_4$ instead of NiO, $Bi_2O_5$ instead of $Bi_2O_3$, and $Sb_2O_4$ or $Sb_2O_5$ instead of $Sb_2O_3$ may be used respectively. Moreover, those salts such as oxalates or carbonates may be used instead of the oxides used in the examples, which are easily decomposed into the respective oxides at elevated temperature. Otherwise, hydroxides of the same character as above may be used instead of the oxides. Moreover, excellent piezoelectric ceramics having similar properties to the above examples is also obtainable by preparing separately powdered material of each of $Pb(Ni_{1/3}Z_{2/3})O_3$ (Z is Bi or Sb), $PbTiO_3$ and $PbZrO_3$ in advance and by using them as starting materials to be mixed subsequently.

The examples No. 16′ of Table 1 and No. 17′ of Table 2 reveal that the excellent piezoelectric activity is still possessed by the compositions in which a part of the lead is replaced by strontium. In general, the piezoelectric activity of the compositions of such a type that lead titanate or lead zirconate is contained is not lost even when up to 25 atom percent of lead contained in the compositions is replaced by at least one of barium, strontium and calcium. This fact can be presumed, for example, from U.S. Pat. 2,906,710. Thus, the substitution as mentioned is permissible in the ceramic compositions of this invention.

Zirconium dioxide ($ZrO_2$) available in the market generally contains several percent of hafnium dioxide ($HfO_2$). Accordingly, the ceramic compositions of this invention are allowed to contain small amounts of such oxides or elements as existing in the materials available in the market. Moreover, it is presumable that the addition of a small amount of some additional agent to the ceramic compositions of this invention may further improve the piezoelectric properties, from a similar fact recognized in the conventional lead titanate zirconate ceramics. It will be understood from the foregoing that the ceramic compositions of this invention may include appropriate additives.

While there have been described what at present are believed to be the preferred examples of this invention, it will be obvious that various modifications can be made therein without departing from the scope of this invention and that this invention covers all the ceramic compositions as specified in the appended claims.

TABLE I

| No. | Mole ratio of composition $Pb(Ni_{1/3}Bi_{2/3})O_3$ $x$ | $PbTiO_3$ $y$ | $PbZrO_3$ $z$ | $k_r$ Percent | $Q_m$ | $\epsilon$ | tan $\delta$ Percent | Curie temperature (° C.) |
|---|---|---|---|---|---|---|---|---|
| 1 | 0.10 | 0.70 | 0.20 | 8 | 520 | 205 | 2.7 | ---------- |
| 2 | 0.05 | 0.65 | 0.30 | 14 | 330 | 240 | 3.1 | ---------- |
| 3 | 0.01 | 0.61 | 0.38 | 7 | 380 | 380 | 2.1 | ---------- |
| 4 | 0.10 | 0.60 | 0.30 | 18 | 270 | 435 | 2.0 | ---------- |
| 5 | 0.05 | 0.55 | 0.40 | 26 | 240 | 485 | 2.2 | ---------- |
| 6 | 0.05 | 0.53 | 0.42 | 38 | 230 | 595 | 1.6 | ---------- |
| 7 | 0.10 | 0.53 | 0.37 | 23 | 240 | 630 | 1.6 | ---------- |
| 8 | 0.20 | 0.53 | 0.27 | 8 | 330 | 350 | 2.3 | ---------- |
| 9 | 0.30 | 0.50 | 0.20 | 6 | 90 | 420 | 3.5 | ---------- |
| 10 | 0.01 | 0.48 | 0.51 | 61 | 250 | 1,210 | 1.7 | ---------- |
| 11* | 0.05 | 0.48 | 0.47 | 57 | 230 | 1,220 | 1.6 | ---------- |
| 12 | 0.10 | 0.48 | 0.42 | 29 | 170 | 1,655 | 2.2 | ---------- |
| 13 | 0.20 | 0.48 | 0.32 | 21 | 160 | 450 | 2.2 | ---------- |
| 14 | 0.30 | 0.48 | 0.22 | 7 | 95 | 1,480 | 3.1 | ---------- |
| 15 | 0.02 | 0.47 | 0.51 | 64 | 320 | 890 | 1.6 | ---------- |

*See footnote at end of Table 2.

TABLE I.—Continued

| No. | Mole ratio of composition Pb(Ni1/3Bi2/3)O3 x | PbTiO3 y | PbZrO3 z | $k_r$ Per-cent | $Q_m$ | $\epsilon$ | tan δ Per-cent | Curie tempera-ture (° C.) |
|---|---|---|---|---|---|---|---|---|
| 16 | 0.05 | 0.46 | 0.49 | 62 | 260 | 640 | 2.7 | 360 |
| 16′ | 0.05 | 0.46 | 0.49 | 59 | 310 | 560 | 2.4 | |
| 17 | 0.10 | 0.46 | 0.44 | 42 | 170 | 845 | 2.5 | |
| 18* | 0.10 | 0.43 | 0.47 | 38 | 180 | 740 | 3.0 | 350 |
| 19 | 0.20 | 0.43 | 0.37 | 24 | 120 | 610 | 3.3 | |
| 20 | 0.10 | 0.40 | 0.50 | 35 | 190 | 650 | 2.5 | |
| 21 | 0.30 | 0.40 | 0.30 | 13 | 120 | 380 | 3.3 | |
| 22* | 0.20 | 0.38 | 0.42 | 33 | 160 | 740 | 1.8 | 330 |
| 23 | 0.10 | 0.35 | 0.55 | 28 | 270 | 520 | 2.5 | |
| 24 | 0.20 | 0.33 | 0.47 | 18 | 270 | 390 | 2.2 | |
| 35 | 0.05 | 0.30 | 0.65 | 27 | 320 | 410 | 2.8 | |
| 26 | 0.40 | 0.28 | 0.32 | 7 | 310 | 440 | 3.2 | 315 |
| 27 | 0.20 | 0.23 | 0.57 | 12 | 350 | 280 | 2.2 | |
| 28 | 0.05 | 0.20 | 0.75 | 18 | 620 | 280 | 2.7 | |
| 29 | 0.05 | 0.10 | 0.85 | 13 | 800 | 215 | 2.5 | |
| 20 | 0.10 | 0.10 | 0.80 | 8 | 390 | 230 | 3.1 | |
| 31 | 0.01 | 0.09 | 0.90 | 11 | 720 | 210 | 3.5 | |
| 32 | 0.05 | 0.05 | 0.90 | 10 | 440 | 170 | 2.5 | |
| 33 | 0.20 | 0.05 | 0.75 | 5 | 570 | 160 | 3.8 | |

[1] See footnote at end of Table 2.

TABLE 2

| No. | Mole ratio of composition Pb(Ni1/3Bi2/3)O3 x | PbTiO3 y | PbZrO3 z | $k_r$ Per-cent | $Q_m$ | $\epsilon$ | tan δ Per-cent | Curie tempera-ture (° C.) |
|---|---|---|---|---|---|---|---|---|
| 1 | 0.05 | 0.75 | 0.20 | 7 | 360 | 240 | 2.4 | |
| 2 | 0.05 | 0.70 | 0.25 | 8 | 430 | 300 | 2.3 | |
| 3 | 0.10 | 0.70 | 0.20 | 15 | 400 | 340 | 2.0 | |
| 4 | 0.05 | 0.60 | 0.35 | 16 | 410 | 330 | 1.7 | |
| 5 | 0.10 | 0.60 | 0.30 | 23 | 370 | 410 | 1.9 | |
| 6 | 0.01 | 0.55 | 0.44 | 16 | 140 | 420 | 2.4 | |
| 7 | 0.05 | 0.55 | 0.40 | 29 | 320 | 360 | 2.0 | |
| 8* | 0.05 | 0.53 | 0.42 | 34 | 260 | 430 | 2.4 | |
| 9 | 0.10 | 0.53 | 0.37 | 30 | 310 | 880 | 2.0 | |
| 10 | 0.20 | 0.53 | 0.27 | 11 | 210 | 990 | 1.6 | |
| 11 | 0.30 | 0.50 | 0.20 | 12 | 410 | 320 | 3.2 | |
| 12 | 0.05 | 0.48 | 0.47 | 61 | 260 | 1,460 | 2.3 | |
| 13* | 0.10 | 0.48 | 0.42 | 47 | 250 | 1,510 | 2.2 | |
| 14 | 0.20 | 0.48 | 0.32 | 33 | 260 | 1,560 | 1.8 | |
| 15 | 0.30 | 0.48 | 0.22 | 17 | 230 | 360 | 3.1 | |
| 16 | 0.02 | 0.47 | 0.51 | 65 | 300 | 820 | 1.8 | 360 |
| 17 | 0.05 | 0.46 | 0.49 | 64 | 270 | 1,120 | 1.9 | 310 |
| 17′ | 0.05 | 0.46 | 0.49 | 62 | 320 | 1,010 | 1.8 | |
| 18 | 0.10 | 0.45 | 0.45 | 54 | 290 | 670 | 1.8 | |
| 19 | 0.05 | 0.43 | 0.52 | 46 | 220 | 560 | 2.2 | |
| 20 | 0.10 | 0.43 | 0.47 | 54 | 290 | 670 | 1.8 | 225 |
| 21* | 0.20 | 0.43 | 0.37 | 53 | 270 | 1,840 | 2.0 | |
| 22 | 0.10 | 0.40 | 0.50 | 40 | 410 | 620 | 2.3 | |
| 23 | 0.30 | 0.40 | 0.30 | 15 | 560 | 450 | 3.0 | |
| 24 | 0.40 | 0.40 | 0.20 | 6 | 440 | 730 | 5.4 | |
| 25 | 0.20 | 0.37 | 0.43 | 42 | 260 | 1,730 | 2.3 | 125 |
| 26 | 0.10 | 0.35 | 0.55 | 36 | 350 | 520 | 1.8 | |
| 27 | 0.20 | 0.33 | 0.47 | 39 | 260 | 1,050 | 2.6 | |
| 28 | 0.30 | 0.33 | 0.37 | 16 | 340 | 820 | 4.0 | 110 |
| 29 | 0.40 | 0.33 | 0.27 | 9 | 590 | 860 | 3.7 | |
| 30 | 0.05 | 0.30 | 0.65 | 29 | 470 | 450 | 1.7 | |
| 31 | 0.40 | 0.28 | 0.32 | 15 | 610 | 740 | 2.7 | |
| 32 | 0.20 | 0.23 | 0.57 | 28 | 120 | 590 | 6.2 | |
| 33 | 0.05 | 0.20 | 0.75 | 21 | 820 | 300 | 2.2 | |
| 34 | 0.05 | 0.10 | 0.85 | 14 | 870 | 260 | 2.5 | |
| 35 | 0.10 | 0.10 | 0.80 | 18 | 380 | 390 | 3.1 | |
| 36 | 0.20 | 0.10 | 0.70 | 11 | 90 | 560 | 5.9 | |
| 37 | 0.01 | 0.09 | 0.90 | 14 | 1,170 | 220 | 1.6 | |
| 38 | 0.05 | 0.05 | 0.90 | 7 | 1,380 | 250 | 1.9 | |
| 39 | 0.20 | 0.05 | 0.75 | 8 | 80 | 510 | 5.7 | |
| 40 | 0.40 | 0.05 | 0.55 | 4 | 270 | 170 | 8.3 | |

NOTE.—In manufacture of the specimens with the asterisked Nos. in Tables 1 and 2, trilead tetroxide ($Pb_3O_4$) was used instead of lead monoxide (PbO) as one of the starting materials. In manufacture of the specimens No. 16′ and No. 17′ of Table 2, strontium carbonate ($SrCO_3$) was added to the starting materials, whereby 5 atom percent of lead (Pb) was replaced by strontium (Sr).

TABLE 3

| No. | Mol ratio of composition PbTiO3 | PbZrO3 | $k_r$ per-cent | $Q_m$ per-cent | $\epsilon$ per-cent | tan δ per cent |
|---|---|---|---|---|---|---|
| 1 | 0.70 | 0.30 | | | 340 | 5.7 |
| 2 | 0.60 | 0.40 | | | 300 | 2.4 |
| 3 | 0.55 | 0.45 | 8 | 30 | 350 | 1.3 |
| 4 | 0.48 | 0.52 | 42 | 250 | 1,060 | 1.6 |
| 5 | 0.45 | 0.55 | 38 | 290 | 640 | 3.0 |
| 6 | 0.40 | 0.60 | 30 | 320 | 460 | 3.1 |
| 7 | 0.30 | 0.70 | 24 | 380 | 380 | 3.3 |
| 8 | 0.20 | 0.80 | 15 | 470 | 350 | 3.3 |
| 9 | 0.10 | 0.90 | 10 | 580 | 280 | 3.4 |

NOTE.—For the specimens Nos. 1 and 2, the evaluation of piezoelectric activity was impossible.

What is claimed is:

1. A piezoelectric ceramic material consisting essentially of a composition represented by the formula $$[Pb(Ni_{1/3}Z_{2/3})O_3]_x[PbTiO_3]_y[PbZrO_3]_z$$

where $x$, $y$ and $z$ represent a set of molecular ratios and $x+y+z=1.00$, where Z represents one element selected from the group consisting of Bi and Sb, and lying within the area A–B–C–D–E–F–G of FIG. 1 of the drawings where Bi is selected for Z and within the area H–I–J–K–L–M of FIG. 4 of the drawings where Sb is selected for Z, the sets of molecular ratios of the vertices of said areas being as follows:

| | x | y | z |
|---|---|---|---|
| A | 0.01 | 0.61 | 0.38 |
| B | 0.01 | 0.09 | 0.90 |
| C | 0.05 | 0.05 | 0.90 |
| D | 0.20 | 0.05 | 0.75 |
| E | 0.40 | 0.28 | 0.32 |
| F | 0.30 | 0.50 | 0.20 |
| G | 0.10 | 0.70 | 0.20 |
| H | 0.01 | 0.55 | 0.44 |
| I | 0.01 | 0.09 | 0.90 |
| J | 0.05 | 0.05 | 0.90 |
| K | 0.40 | 0.05 | 0.55 |
| L | 0.40 | 0.40 | 0.20 |
| M | 0.05 | 0.75 | 0.20 |

2. The piezoelectric ceramic material claimed in claim 1, wherein up to 25 atom percent of Pb is replaced by an element selected from the group consisting of Ba, Sr, and Ca.

References Cited

UNITED STATES PATENTS

| | | | |
|---|---|---|---|
| 3,268,453 | 8/1966 | Ouclin et al. | 252—62.9 |
| 3,463,732 | 8/1969 | Banno et al. | 252—62.9 |
| 3,464,924 | 9/1969 | Banno et al. | 252—62.9 |

TOBIAS E. LEVOW, Primary Examiner

J. COOPER, Assistant Examiner

U.S. Cl. X.R.

106—39